United States Patent
van Waasen et al.

(10) Patent No.: US 9,020,073 B2
(45) Date of Patent: Apr. 28, 2015

(54) LOW INTERMEDIATE FREQUENCY RECEIVER

(75) Inventors: Stefan van Waasen, Kolbermoor (DE); Christian Grewing, Sollentuna (SE); Michael Lewis, London (GB)

(73) Assignee: Intel Mobile Communications GmbH, Neubiberg (DE)

( * ) Notice: Subject to any disclaimer, the term of this patent is extended or adjusted under 35 U.S.C. 154(b) by 2211 days.

(21) Appl. No.: 11/877,455

(22) Filed: Oct. 23, 2007

(65) Prior Publication Data

US 2009/0103654 A1    Apr. 23, 2009

(51) Int. Cl.
| | |
|---|---|
| H03K 9/00 | (2006.01) |
| H04L 27/00 | (2006.01) |
| H04L 27/38 | (2006.01) |
| H04B 1/30 | (2006.01) |

(52) U.S. Cl.
CPC ...... *H04L 27/38* (2013.01); *H04B 1/30* (2013.01); *H04L 27/3845* (2013.01); *H04L 27/3881* (2013.01)

(58) Field of Classification Search
USPC .......... 375/316, 324, 349; 455/323, 324, 334
See application file for complete search history.

(56) References Cited

U.S. PATENT DOCUMENTS

| | | |
|---|---|---|
| 6,922,555 B1 | 7/2005 | Mohindra |
| 7,065,329 B2 | 6/2006 | Marshall |
| 7,136,431 B2 | 11/2006 | Shi et al. |
| 2002/0058491 A1 | 5/2002 | Minnis et al. |
| 2002/0065060 A1 | 5/2002 | Minnis et al. |
| 2005/0225370 A1 | 10/2005 | Harms et al. |
| 2005/0248407 A1 | 11/2005 | Friedrich et al. |
| 2005/0255822 A1 | 11/2005 | Friedrich et al. |
| 2005/0277389 A1 | 12/2005 | Friedrich et al. |
| 2006/0056357 A1 | 3/2006 | Payne et al. |
| 2006/0058001 A1* | 3/2006 | Minnis et al. ................. 455/334 |
| 2007/0076827 A1* | 4/2007 | Beamish et al. ............. 375/345 |
| 2009/0040391 A1* | 2/2009 | Ling et al. ..................... 348/726 |

FOREIGN PATENT DOCUMENTS

| | | |
|---|---|---|
| DE | 10232195 A1 | 2/2004 |
| WO | 2007034420 A2 | 3/2007 |

* cited by examiner

*Primary Examiner* — Freshteh N Aghdam
(74) *Attorney, Agent, or Firm* — Eschweiler & Associates, LLC

(57) ABSTRACT

One embodiment relates to a low intermediate frequency (IF) receiver. The low-IF receiver includes an analog front end that is configured to receive a modulated IQ data signal and provide an in-phase signal and a quadrature signal, where the in-phase signal is phase shifted by approximately 90° relative to the quadrature signal. The low-IF receiver further includes a digital processing block, and a single path that provides only one of the in-phase signal and the quadrature signal to the digital processing block. Other receivers and methods are also disclosed.

7 Claims, 4 Drawing Sheets

LOW INTERMEDIATE FREQUENCY RECEIVER

FIELD OF THE INVENTION

The present invention relates generally to communication systems, and more specifically to receivers used within these communication systems.

BACKGROUND

Several trends presently exist with regards to wireless communication devices. For example, in comparison to previous generations of wireless devices, modern wireless devices are more compact, more affordable, and have longer battery lifetimes. While consumers may largely take these trends for granted, these trends are the result of significant engineering efforts.

To communicate with other devices, many wireless devices include receivers. These receivers are typically included in chip sets that enable wireless communication via one of several communication standards, such as Bluetooth, Digital Enhanced Cordless Telecommunication (DECT), and numerous others. Because these chip sets are used commonly in cell phones, music players, personal digital assistants (PDAs), etc., it is desirable for the chip sets to be relatively compact and efficient, thereby providing lower cost, higher performance products in a smaller footprint.

In recent years, one way in which designers have tried to deliver compact and efficient chipsets is by including zero intermediate frequency (IF) receivers. A zero IF receiver enables direct conversion of analog radio frequency (FREQ) signals to a digital baseband. This typically reduces the component count, and may correspondingly limit the footprint and cost of the chipset. By reducing the number of components, zero IF receivers also simplify the supply chain and improve manufacturing yield.

While zero-IF receivers offer a more compact chipset, technical barriers often limit the extent to which such receivers can be used in modern communication systems. For example, because a local oscillator signal (LO) in these receivers is the same as the RF frequency, the LO signal may leak from the receiver to the antenna, which can cause interference with other receivers on the same frequency-band. Also, DC offset, which comes from the self-mixing of LO leakage, may seriously deteriorate the SNR (Signal Noise Ratio).

One type of receiver that limits both of these shortcomings (i.e., LO leakage and DC offset) is a low-IF receiver. In low-IF receivers, the received RF frequency is down-converted to a low, but non-zero IF, before being down-converted to the baseband. Thus, the down-conversion from the received RF frequency to the baseband will have one or more IFs, where each IF corresponds to a separate stage in the receiver. Due to the fact that these separate stages are relatively area intensive, conventional low-IF receivers have a relatively large footprint.

In order to continue to meet and exceed consumers' growing expectations with regards to compactness, affordability, and battery life; improved low IF receivers are needed. Ideally, these improved low-IF receivers will provide relatively high-performance in a relatively small footprint.

SUMMARY

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment relates to a low intermediate frequency (IF) receiver. The low-IF receiver includes an analog front end that is configured to receive a modulated IQ data signal and provide an in-phase signal and a quadrature signal, where the in-phase signal is phase shifted by approximately 90° relative to the quadrature signal. The low-IF receiver further includes a digital processing block, and a single path that provides only one of the in-phase signal and the quadrature signal to the digital processing block.

The following description and annexed drawings set forth in detail certain illustrative aspects and implementations of the invention. These are indicative of but a few of the various ways in which the principles of the invention may be employed.

DETAILED DESCRIPTION

The present invention will now be described with respect to the accompanying drawings in which like numbered elements represent like parts. The figures and the accompanying description of the figures are provided for illustrative purposes and do not limit the scope of the claims in any way.

Figure 1:
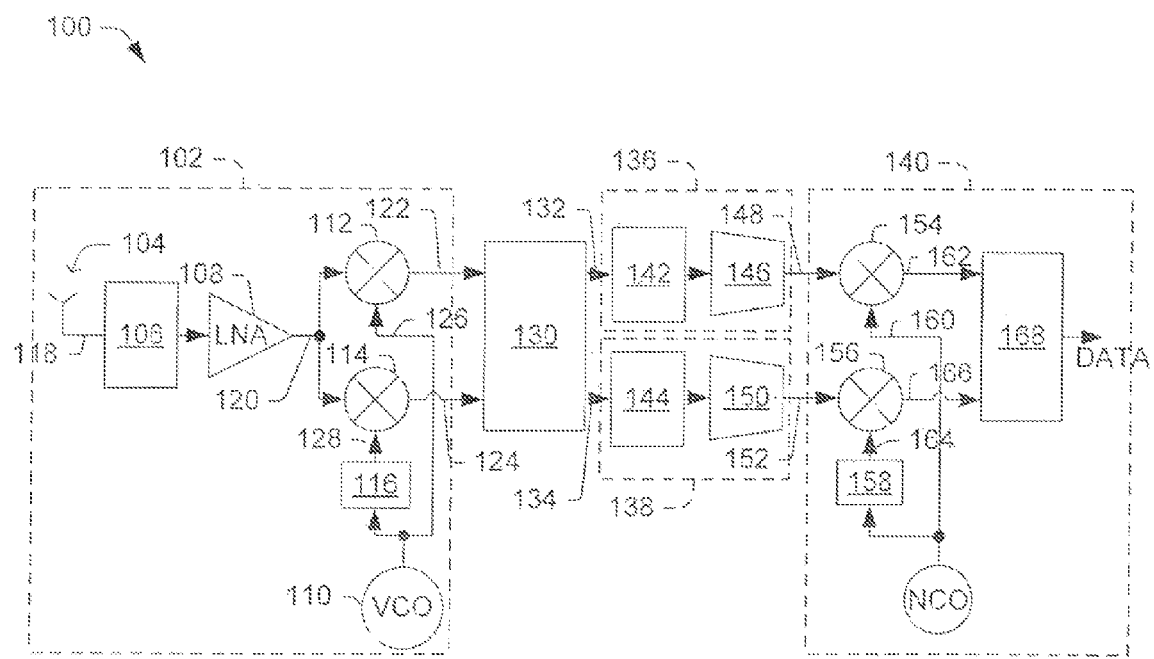
FIG. 1 is a block diagram of one embodiment of a low-IF receiver.

Referring to FIG. 1, one can see one embodiment of a low-intermediate frequency (low-IF) receiver 100. The low-IF receiver 100 includes an analog front end 102 with an I/Q demodulator structure. This analog front end 102 includes the following components: an antenna 104, a matching network 106, low-noise amplifier (LNA) 108, a voltage controlled generator (VCO) 110, two mixers (112, 114), and a 90° phase shift module 116.

During operation, the LNA 108 passes modulated IQ data received from the antenna 104 to the first and second mixers 112, 114, respectively. In essence, the first and second mixers 112, 114, respectively, perform signal multiplication and either up-convert or down-convert the amplified IQ data signal 120 from a received frequency (FREQ) to an intermediate frequency (IF). In FIG. 1's embodiment, the first mixer 112 converts the received IQ data signal 120 to an in-phase signal (I) 122 at IF, while the second mixer 114 converts the amplified 10 data signal 120 to a quadrature signal (Q) 124 at IF. More specifically, the first mixer 112 mixes the amplified IQ data signal 120 with an in-phase local oscillator (LO) signal 126 to produce the in-phase (I) signal 122. The second mixer 114 mixes the amplified IQ data signal 120 with a phase-shifted LO signal 128 to produce the Q-signal 124.

In various embodiments the low-IF receiver 100 could utilize low-side injection (e.g., where IF=FREQ−LO) as well as high-side injection (e.g., where IF=LO−FREQ). In other embodiments, the low-IF receiver 100 could have multiple IFs, where separate stages step down the frequency from one IF to the next IF.

For illustrative purposes, some typical frequency values for some common standards are now provided below. These frequency values are merely illustrative and it will be appreciated that aspects of the invention are also applicable to numerous other frequency ranges. In some Bluetooth embodiments, FREQ could range from approximately 2.4 GHz to approximately 2.48 GHz and the IF could be approximately 1 MHz; while in other Bluetooth embodiments FREQ could range from approximately 2.4 GHz to approximately 2.48 GHz and the IF could be approximately 1.5 MHz. In one global positioning system (GPS) embodiment, FREQ could be approximately 1.575 GHz and the IF could be approximately 2 MHz. In one DECT embodiment, FREQ could range from about 1.88 GHz to about 1.93 GHz and the IF could be about 1 MHz. As a person of ordinary skill in the art will appreciate in light of this disclosure, these and other variations are contemplated as falling within the scope of the present invention.

An optional filtering block 130 filters the I-signals 122 and Q-signal 124 to provide first and second filtered signals 132, 134, respectively, in which unwanted image signals have been removed. In some embodiments, the filtering block 130 could be a complex polyphase filter.

First and second paths 136, 138 carry the optionally filtered signals 132, 134 to a digital processing block 140. The first and second paths 136, 138 each include a limiters or programmable gain amplifiers (PGA) 142, 144, respectively to limit or amplify the filtered signals. A first analog-to-digital converter (ADC) 146 converts the first optionally filtered signal 132 into a digital in-phase signal at IF 148, while a second ADS 150 converts the second optionally filtered signal 134 into a digital quadrature signal at IF 152.

The digital processing block 140 then demodulates the digital in-phase signal 148 and digital quadrature signal 152 from the IF to the baseband. Often, processes in this digital processing block 140 are carried out by a digital signal processor (DSP), ASIC, microprocessor, microcontroller, etc. To perform this conversion, the digital processing block 140 may include a first digital mixer 154, a second digital mixer 156, and a 90° phase shift module 158, any of which could be implemented in hardware or software depending on the implementation. The first digital mixer 154 mixes the digital in-phase signal 148 with an in-phase numerically controlled oscillator (NCO) signal 160 to produce a first digitally mixed signal 162. The second digital mixer 156 mixes the digital quadrature signal 152 with a phase-shifted numerically controlled oscillator (NCO) signal 164 to produce a second digitally mixed signal 166.

In addition to down-conversion from the IF to the baseband, the digital processing block 140 may also include a block for additional processing 168. This additional processing block may perform, for example, constellation demapping, decoding, descrambling, and/or other suitable formatting to provide the digital data to an application. For example, this additional processing may relate to one of several standards, such as Bluetooth, IEEE 802.11, global systems for mobile communications (GSM), code division multiple access (CDMA), etc.

The low-IF receiver 100 may be fabricated with varying levels of integration. For example, in one embodiment the components described above may all be manufactured on a single integrated circuit, less the antenna 104. In other embodiments, by contrast, the analog front end 102 may be manufactured on one integrated circuit while the digital processing block 140 may be manufactured on another integrated circuit. In still another example, the analog front end 102 could be pieced together by using several integrated circuits as could the digital processing block 140. Other variations are also contemplated as falling within the scope of the invention.

Thus, one advantage of this low-IF receiver 100 is that offers the possibility for a fully integrated and adjustment free solution. Further it can perform filtering on all channels without the major challenges associated with typical DC-offset problems in zero-IF structures. Also, this low-IF receiver 100 can eliminate an image signal due to the use of an optional filtering block 130 that includes a complex low-pass polyphase filter.

Figure 2:
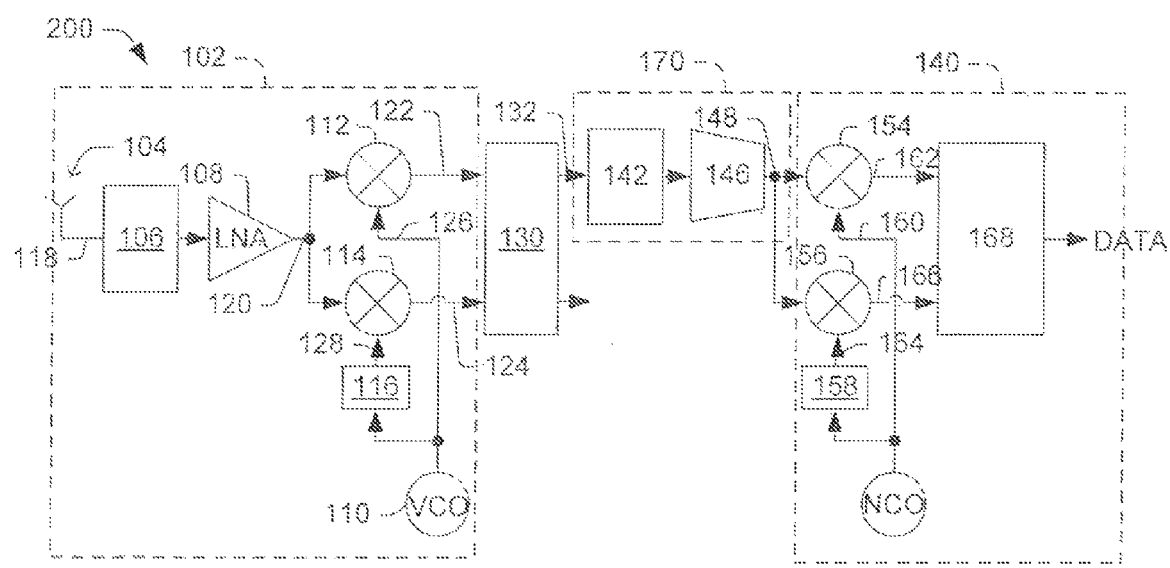
FIG. 2 is a block diagram of another embodiment of a low-IF receiver.

However, while this low-IF receiver 100 offers several advantageous over other receivers, the inventors have appreciated that even further refinements may be made in various embodiments. For example, in one embodiment shown in FIG. 2, a low-IF receiver 200 may include a single path 170 (instead of the two paths 136, 138 shown in FIG. 1) to carry signals between the analog front end 102 and the digital processing block 140. The single path 170 could be either of the paths 136, 138 previously discussed, but typically includes only one of them and not both. By using a single path 170, the low-IF receiver 200 may still offer the advantages described above, although it will also process fewer signals and will correspondingly consume less area and have fewer transistors. Therefore, the low-IF receiver 200 will be cheaper to manufacture due to its decreased area, and may help facilitate more compact wireless communication devices. In addition, due to the fact that this low-IF receiver 200 has fewer transistors, it may also consume less power, thereby providing wireless communication devices with extended battery life.

Conventionally, it has been believed that both an I-data path and a separate Q-data path were required in low-IF receivers. Therefore, in some aspects of the invention, the inventors have appreciated that a single path 170 can still allow proper receipt of communicated information. Although some examples may be described herein where the single path 170 relates to I-data, it will be appreciated that the single path could alternatively relate to Q-data. In either case, improvements in area and power consumption (battery life) may be achieved.

Figure 3:
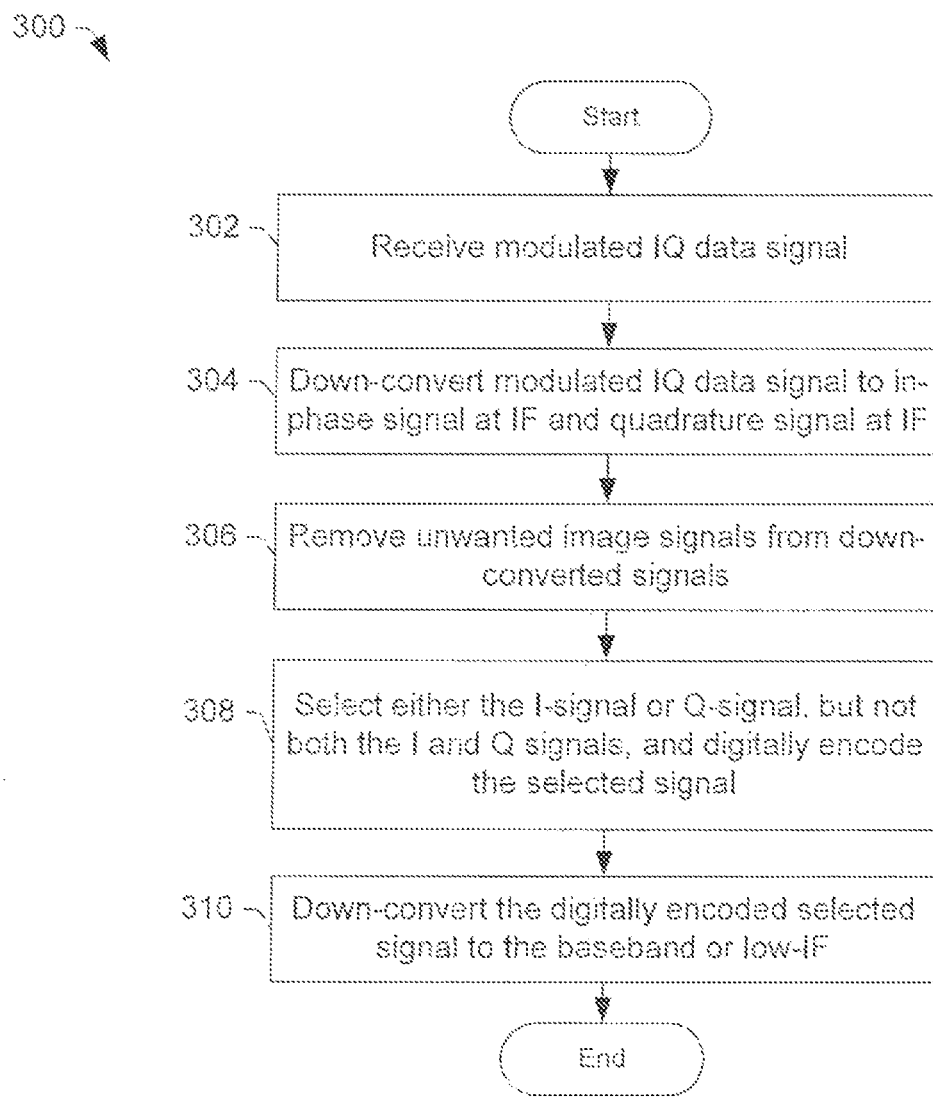
FIG. 3 is a flowchart of a method for processing a signal.

Referring now to FIGS. 3-4, one can see some examples of methods 300, 400 for operating a low-IF receiver as described above. Although these methods are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the devices and systems illustrated and described herein (e.g., low-IF receiver 200), as well as in association with other structures not illustrated.

Referring now to FIG. 3, one can see a method 300 that starts at block 302 when the low-IF receiver receives modulated IQ data.

At block 304, the low-IF receiver uses an intermediate frequency to down-convert the modulated IQ data into an in-phase (I) signal and a quadrature (Q) signal. Typically, these signals are approximately 90° phase shifted relative to one another.

At block 306, the low-IF receiver removes unwanted image signals from the I and Q signals.

At block 308, the low-IF receiver selects either the I-signal or Q-signal, but not both signals, and then digitally encodes the selected signal.

At block 310, the low-IF receiver down converts the digitally encoded selected signal to the baseband or low-IF. Additional processing may also be carried out at this block to suitably format the data in accordance with a particular communications standard.

Figure 4A:
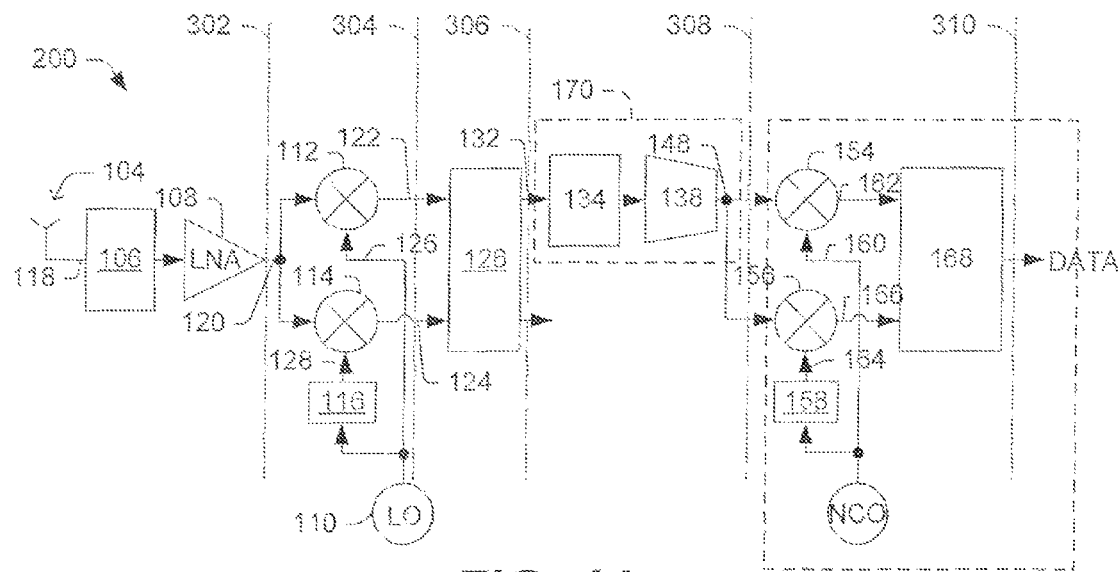
FIGS. 4A-4B are functional diagrams illustrating one sample embodiment in accordance with the method of FIG. 3.
Figure 4B:
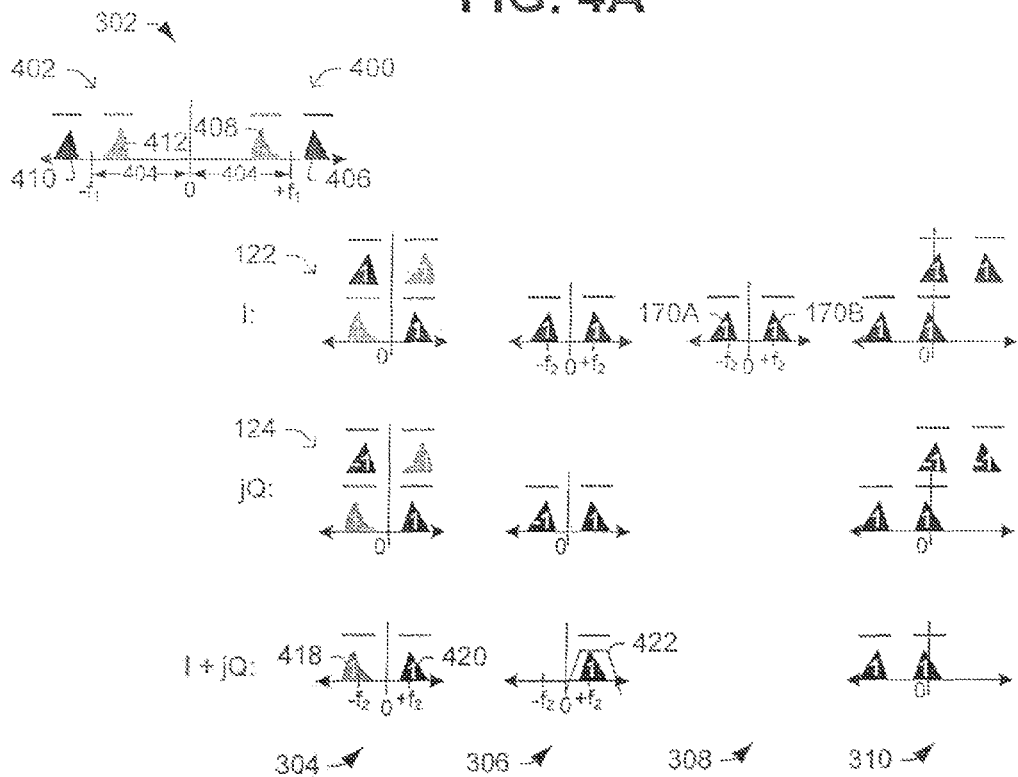

FIGS. 4A-4B show more detailed signal characteristics in the low-IF receiver 200 at various planes of the device. More particularly, these figures show a functional block diagram view (FIG. 4A), and signals (FIG. 4B) that occur at the various planes of the functional block diagram as indicated. Although these figures show one example of some signals that could correspond to the blocks of method 300, it will be appreciated that other signals and receivers are contemplated as falling within the scope of the invention.

At plane 302, a modulated IQ data signal has been received at the antenna 104 and passed through the LNA 108. As shown, the modulated IQ data signal 118 includes positive frequencies 400 that could be centered about frequency $+f_1$ and negative frequencies 402 that could be centered about frequency $-f_1$. In typical embodiments, a common frequency 404 could separate both frequencies $+f_1$, $-f_1$ from the baseband (i.e., zero frequency).

More particularly, the positive frequencies 400 include a positive wanted signal 406 and a positive image signal 408, and the negative frequencies 402 include a negative wanted signal 410 and a negative image signal 412. The solid horizontal lines above the signals represent noise margins that could be associated with these signals. Typically, the wanted (desired) signals carry information in a manner that allows structured communication to take place. For example, the wanted signals could be communicated over a particular channel or frequency within a frequency spectrum, which particular channel could be part of a frequency hopping scheme. The image signals, by contrast, are often undesired artifacts that could ultimately be disposed of.

At plane 304, the mixers 112, 114 have broken down the modulated IQ data into an I-signal (I:) 122 and a Q-signal (Q:) 124. By configuring the VCO 110 to provide an LO that relates to the common frequency 404 (i.e., $|f_1|$), the positive and negative frequencies 402, 404 are effectively re-centered about the baseband (i.e., zero frequency). With respect to the i-signal, the negative frequencies 402 have been up-converted 414 to the IF and the positive frequencies 400 have been down-converted 416 to the IF. The Q-signal is somewhat similar, although the signs of the respective frequencies may be inverted due to the 90 degree phase shift between the I-data and Q-data (e.g., a positive frequency signal may become a negative frequency signal, and vice versa). The I+jQ signal, which is the summation of the I-signal and Q-signal, shows an image component 418 that could be positioned about a negative frequency $-f_2$ and a wanted component 420 that could be positioned about a positive frequency $+f_2$.

At plane 306, the filtering block 130 is set up to filter all (or substantially all) components other than those within a particular frequency range 422 that is centered about the positive frequency $+f_2$. Both I and Q are filtered, otherwise not only the negative frequencies will be attenuated. Thus, in the illustrated embodiment, the complex filter is configured to pass only the wanted signal 420, while filtering out the image signal 418. As one of ordinary skill in the art will appreciate, the wanted signals and image signals could also be interchanged and the filtering will be corresponding at negative frequencies.

At plane 308, one can see that only a single path 170 operably couples the filtering block 130 to the digital processing block 140. Therefore, in this embodiment only I-data (and not Q-data) is digitally encoded and passed to the digital processing block 140. Notably, in other embodiments, Q-data could be selected. By using only one signal, only the wanted signal is not eliminated any longer at negative frequencies by I and Q. By looking at I or Q only, one will appreciate that the wanted signal occurs separately all the time.

At plane 310, the digital processing block 140 up-converts and/or down-converts the digitally encoded I-data to a low-IF or baseband, which is supplied by the NCO and which correspond to $|f_2|$. For example, with respect to the I-data, the first digital mixer 154 has shifted the digitally encoded I-data 148 up by the low-IF and down by the low-IF. Somewhat similarly, the second digital mixer 156 has shifted the digitally encoded I-data 148 up by the low-IF and down by the low-IF, where appropriate sign conventions are shown. When the I-data and Q-data are added together, one of ordinary skill in the art will appreciate that from a signal processing point of view an equivalent result is achieved in this low-IF receiver 200 as the previous low-IF receiver 100, but with less circuitry. Further, it will be appreciated that the resultant I+jQ data for a given time interval could represent various lengths of data (e.g., symbols carrying 1 bit, 10 bits, 15 bits, etc.) that vary according to the particular implementation, noise conditions within any given implementation, etc.

Although the invention has been shown and described with respect to a certain aspect or various aspects, equivalent alterations and modifications will occur to others skilled in the art upon the reading and understanding of this specification and the annexed drawings. In particular regard to the various functions performed by the above described signals (assemblies, devices, circuits, etc.), the terms (including a reference to a "means") used to describe such signals are intended to correspond, unless otherwise indicated, to any signal which performs the specified function of the described signal (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A low intermediate frequency (IF) receiver, comprising:
an analog front end that is configured to receive a modulated IQ data signal and provide an in-phase signal and a quadrature signal, where the in-phase signal is phase shifted by approximately 90° relative to the quadrature signal;
a single path that provides only one of the in-phase signal and the quadrature signal to a digital processing block; and
wherein the digital processing block comprises: first and second digital mixers that each receive the same one signal from the single path, wherein the first digital mixer processes the one signal as a function of a first oscillator signal and wherein the second digital mixer processes the one signal as a function of a second oscillator signal that is approximately 90° phase shifted with respect to the first oscillator signal.

2. The receiver of claim 1, further comprising:
a filtering block that filters at least one, if not both, of: the in-phase signal and the quadrature signal; and which the filtering block provides filtered signals to the digital processing block.

3. The receiver of claim 1, wherein the one signal is a digitally encoded signal and wherein the first digital mixer processes the digitally encoded signal as a function of a first numerically controlled oscillator signal and where the second mixer processes the digitally encoded signal as a function of a second numerically controlled oscillator signal that is phase shifted by about 90 degrees relative to the first numerically controlled oscillator signal.

4. The receiver of claim 1, where the analog front end further comprises:
a first mixer for providing the in-phase signal as a function of the modulated IQ data signal and a first local oscillator signal; and
a second mixer for providing the quadrature signal as a function of the modulated IQ data signal and a second local oscillator signal that is phase shifted by approximately 90° relative to the first local oscillator signal.

5. The receiver of claim 1 wherein the single path carries the quadrature signal and not the in-phase signal.

6. The receiver of claim 5, wherein the receiver is devoid of circuitry for processing the in-phase signal.

7. The receiver of claim 1, wherein the one signal has the same phase when received by the first and the second digital mixers.

* * * * *